Oct. 16, 1956  H. E. SCHULTHEIS  2,766,722
AUTOMATIC STOPPING MECHANISM FOR MILKING MACHINES
Filed Oct. 11, 1954  2 Sheets-Sheet 1
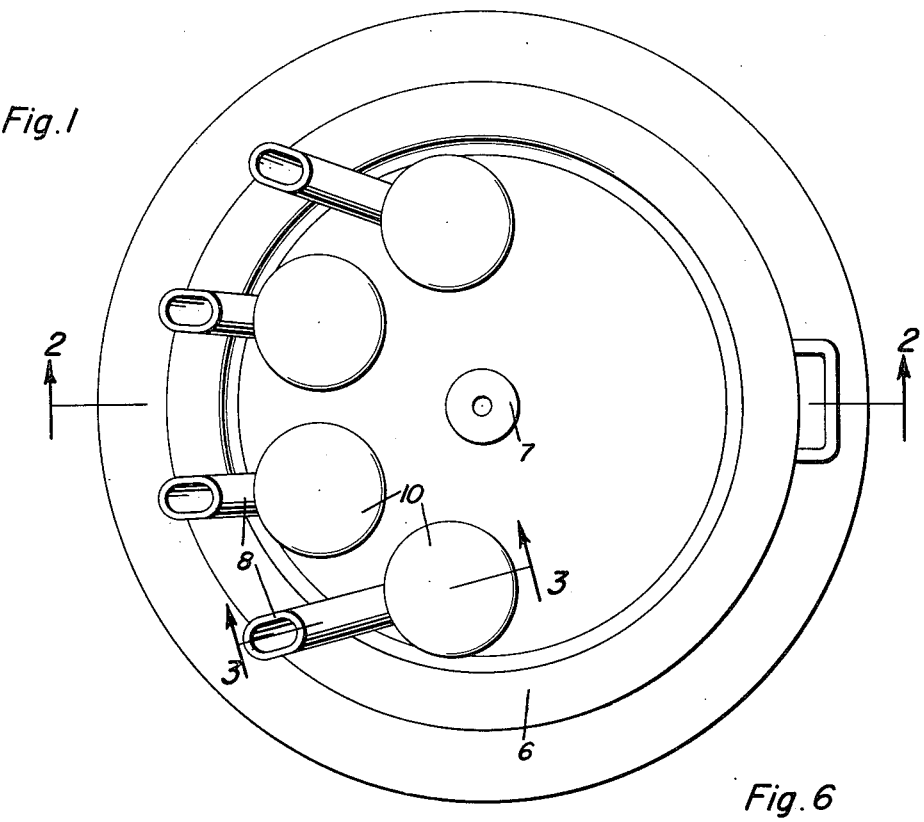
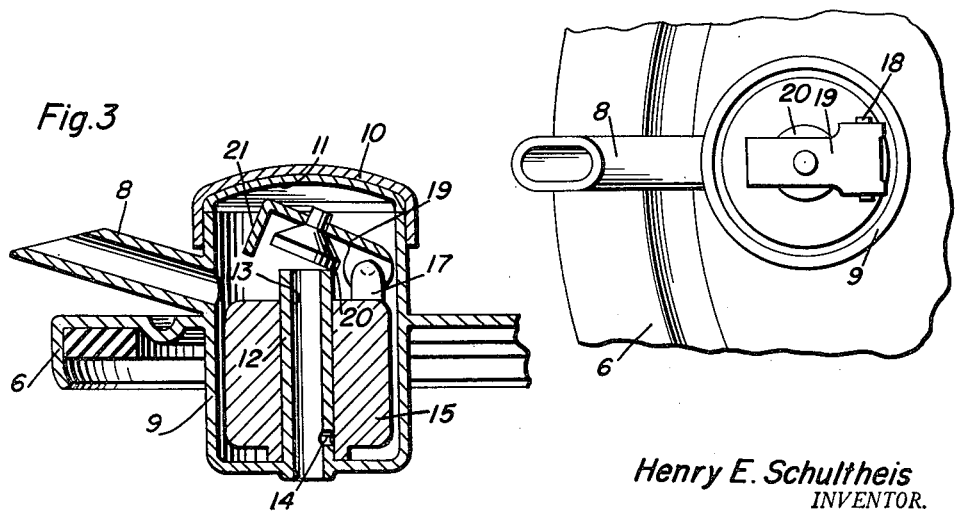
Henry E. Schultheis
INVENTOR.
BY Clarence A. O'Brien
and Harvey B. Jacobson
Attorneys Oct. 16, 1956     H. E. SCHULTHEIS     2,766,722
AUTOMATIC STOPPING MECHANISM FOR MILKING MACHINES
Filed Oct. 11, 1954     2 Sheets-Sheet 2
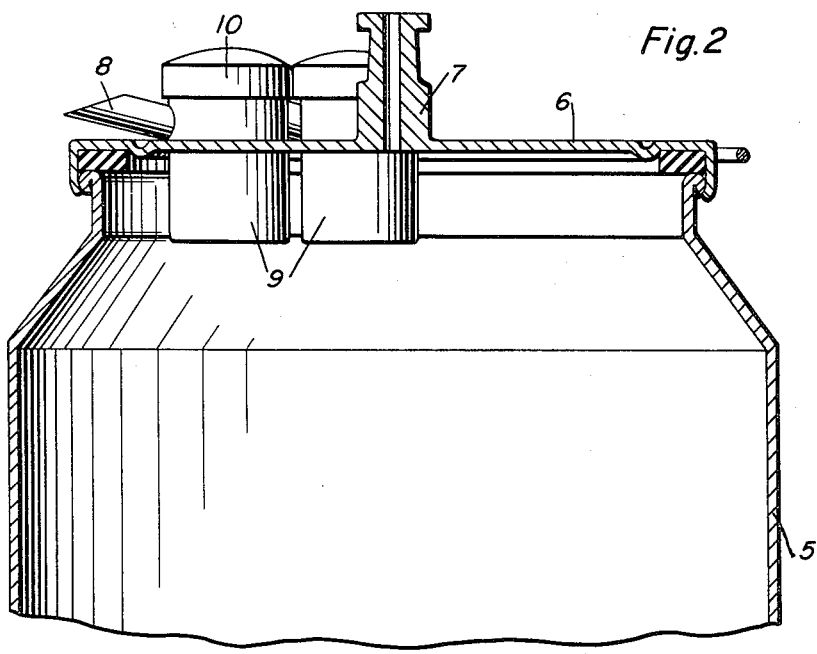
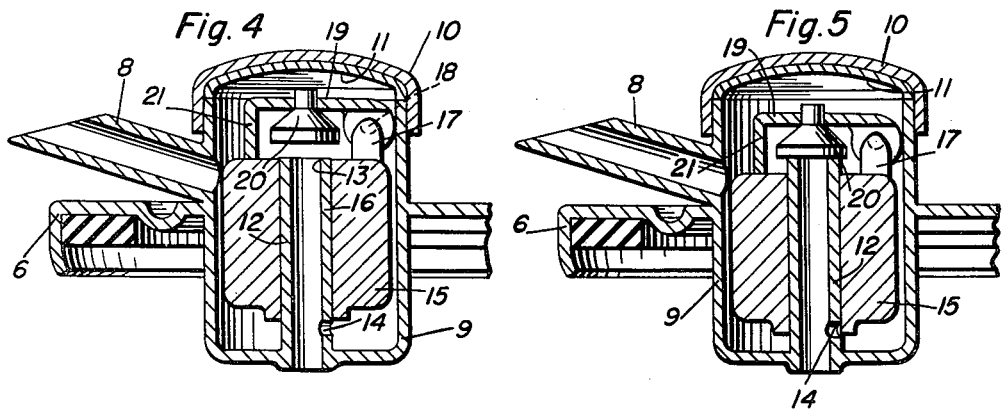
Henry E. Schultheis
INVENTOR.
BY *Clarence A. O'Brien*
*and Harvey B. Jacobson*
Attorneys

United States Patent Office 2,766,722
Patented Oct. 16, 1956

2,766,722

AUTOMATIC STOPPING MECHANISM FOR MILKING MACHINES

Henry E. Schultheis, Long Beach, Calif.; Lee L. Newman, executor of the estate of said Henry E. Schultheis, deceased Application October 11, 1954, Serial No. 461,436

11 Claims. (Cl. 119—14.08)

The present invention relates to new and useful improvements in attachments for milking machines to automatically stop the milking action when the flow of milk ceases to thus avoid injury to the cow.

An important object of the invention is to provide a float controlled valve for the hose leading from the suction operated teat cups and which is automatic in its operation to cut off the suction and detach the cup when the flow of milk ceases.

Another object is to provide a device of this character of simple and practical construction which is efficient and reliable in operation, relatively inexpensive to manufacture and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the tank showing the valve chambers attached thereto;

Figure 2 is a vertical sectional view taken on a line 2—2 of Figure 1;

Figure 3 is an enlarged vertical sectional view taken on a line 3—3 of Figure 1 and showing the valve in starting position;

Figure 4 is a simliar view showing the valve in flow position;

Figure 5 is a similar view showing the valve in stopping position;

Figure 6 is a top plan view of the valve chambers with the cap removed therefrom.

In accordance with conventional practice, a milking machine includes a tank 5 having a cover 6 provided with a nipple 7 for attaching a hose which leads to a pulsator or pump (not shown) and which provides the necessary suction to operate the teat cups. Milk drawn from the teat cups flows through hose to nipples 8 which project outwardly at the upper side portions of chambers 9 supported by the cover 6. A cap 10 having a lining 11 seals the top of the chamber.

Each chamber is of duplicate construction and includes a central upstanding tube 12 which opens at its lower end into the tank and is open at its upper end to form a valve seat 13. A lateral port 14 is formed in the lower portion of the tube.

A float 15 is formed with a vertical central bore 16 for sliding on tube 12 and a bracket 17 projects upwardly from the top of the float with a pin 18 supported thereon and on which an arm 19 is pivoted at one end for vertical swinging movement above the upper end of tube 12. A valve 20 is attached to the underside of the arm in a position for engaging valve seat 13 to close the tube. A stop 21 projects downwardly at the free end of arm 19 to engage the top of float 15 and the stop is of a length to project downwardly below valve 20.

In the operation of the device, when the chamber 9 is empty, the float 15 will rest on the bottom thereof and close port 14 and valve 20 will rest at an angle on the upper end of tube 12, as shown in Figure 3, to hold the valve open in its starting position. When the teat cup is attached to the teat of the cow and the machine started, milk drawn into the chamber 9 will raise the float to open port 14 and stop 21 will support valve 20 above tube 12 in open or flow position, as shown in Figure 4, so that the milk will flow freely into the tank.

When the flow of milk ceases, the float will drop to the position shown in Figure 5 to close port 14 and retain sufficient liquid in the chamber to maintain the float slightly raised to close valve 20 and suction is thereby cut off to the related teat cup to stop its milking action.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An automatic valve for a milking machine having a tank equipped for connecting suction means thereto, said valve comprising a chamber having a milk inlet in its upper portion and a milk outlet tube therein provided with a lateral port, and fluid actuated means in the chamber for closing the tube and the port upon predetermined reduction of flow into the chamber.

2. An automatic valve for a milking machine having a tank equipped for connecting suction means thereto, said valve comprising a chamber having a milk inlet in its upper portion and a milk outlet tube therein provided with a lateral port, and float control means in the chamber for closing both the tube and the port upon predetermined reduction of flow into the chamber.

3. An automatic valve for a milking machine having a tank equipped for connecting suction means thereto, said valve comprising a chamber having a milk inlet in its upper portion and a milk outlet tube therein provided with a lateral port, a float in the chamber and arranged for opening and closing the port and a valve actuated by the float for opening and closing passage through the tube.

4. The construction of claim 1 wherein said fluid actuated means constitutes closure means for the port, and closure means for the tube carried by the fluid actuated means, said closure means for the tube remaining open when the port is closed.

5. The construction of claim 1 and including closure means for the tube carried by the fluid actuated means and maintained open while the chamber is empty.

6. The construction of claim 1 wherein said fluid actuated means includes control means for the tube as well as control means for the port and both actuated by the fluid actuated means to maintain the tube open while the port is closed when the fluid actuated means is moved into one position, and to open the port while maintaining the tube open when the fluid actuated means is moved into a second position, and to simultaneously close both the tube and the port when the fluid actuated means is moved into a third position.

7. The construction of claim 3 and including means connecting the valve to the float for holding the valve open while the port is closed.

8. The combination of claim 3 and including means connecting the valve to the float for holding the valve open while the chamber is empty.

9. An automatic valve for a milking machine having a tank equipped for connecting suction means thereto, said valve comprising a chamber having a milk inlet in its upper portion and a milk outlet tube therein provided with a lateral port, a float in the chamber and slidable vertically on the tube for opening and closing the port, an arm pivoted to the float, and a valve carried by the arm in a position for opening and closing the upper end of the tube.

10. An automatic valve for a milking machine having a tank equipped for connecting suction means thereto, said valve comprising a chamber having a milk inlet in its upper portion and a milk outlet tube therein provided with a lateral port, a float in the chamber and slidable vertically on the tube for opening and closing the port, an arm pivoted to the top of the float, a valve carried by the arm in a position for raising and lowering movement to open and close the upper end of the tube, and a stop on the arm engaging the float to hold the valve open when the float is raised.

11. An automatic valve for a milking machine having a tank equipped for connecting suction means thereto, said valve comprising a chamber having a milk inlet in its upper portion and a milk outlet tube therein provided with a lateral port, said tube being positioned vertically in the chamber, a float in the chamber and slidable vertically on the tube for opening and closing the port, an arm pivoted to the top of the float for vertical swinging movement and overlying the upper end of the tube, a valve carried by the arm in a position for opening and closing the upper end of the tube, and a stop on the arm engaging the top of the float to maintain the valve open when the float is raised, and said arm being swingable by the float into an inclined position when the float is lowered to maintain the valve open.

References Cited in the file of this patent

UNITED STATES PATENTS

| | | |
|---|---|---|
| 2,466,841 | Eades | Apr. 12, 1949 |
| 2,685,862 | Hill et al. | Aug. 10, 1954 |

FOREIGN PATENTS

| | | |
|---|---|---|
| 27,102 | Denmark | Jan. 17, 1921 |
| 109,446 | Australia | Jan. 11, 1940 |
| 111,577 | Australia | Oct. 3, 1940 |